United States Patent [19]

Norimatsu

[11] 4,274,192
[45] Jun. 23, 1981

[54] TOOL SHIFTER

[75] Inventor: Michio Norimatsu, Oaza Koguchi, Japan

[73] Assignee: Kabushiki Kaishi Yamazaki Tekkosho, Aichi, Japan

[21] Appl. No.: 79,994

[22] Filed: Sep. 28, 1979

Related U.S. Application Data

[63] Continuation-in-part of Ser. No. 875,537, Jan. 30, 1978, abandoned.

[30] Foreign Application Priority Data

Feb. 4, 1977 [JP] Japan .................................. 52-12025

[51] Int. Cl.³ .............................................. B23Q 3/157
[52] U.S. Cl. ......................................................... 29/568
[58] Field of Search .................. 29/568; 414/728, 730, 414/740, 751, 783, 225, 226

[56] References Cited

U.S. PATENT DOCUMENTS

| 3,161,951 | 12/1964 | Anthony | 29/568 |
| 3,823,466 | 7/1974 | Jerue | 29/568 |

Primary Examiner—William R. Briggs
Attorney, Agent, or Firm—Wenderoth, Lind & Ponack

[57] ABSTRACT

The present invention relates to a tool shifter which performs three kinds of operations, namely, grasping and releasing of a tool, changing of the attitude of a tool and inserting a tool into and removing a tool from a tool magazine by a single hydraulic cylinder for a machine tool the axis of the tool in the tool magazine being disposed at an angle to the main shaft of the machine tool.

4 Claims, 9 Drawing Figures

TOOL SHIFTER

BACKGROUND OF THE INVENTION

This application is a continuation-in-part of application Ser. No. 875,537, filed Jan. 30, 1978, now abandoned.

Heretofore, almost all the tool magazines for a machine tool of the tool exchanging type have been attached to the machine so that the main shaft of the machine tool and that of the axes of the tools in the tool magazine are parallel to each other. In prior art machine tools in which the tool axes are at an angle to the main shaft, the grasping and releasing of the tool, the changing of the attitude of the tool and the insertion into and removal of the tool from the tool magazine have been carried out respectively by an independent mechanism with a separate driving source. Therefore, the structure has become so complicated for a large scale system that the production cost for the machine tool has become unnecessarily high.

BRIEF SUMMARY OF THE INVENTION

The first object of the present invention is to simplify the tool exchanging mechanism for a machine tool of the foregoing tool exchanging type.

The second object of the present invention is to provide a tool changing mechanism which greatly shortens the time required for changing the tool and, also, contributes to the promotion of productivity.

Other and further purposes, features and advantages of the invention will appear more fully from the following description.

To overcome the drawbacks described above, the present invention provides an apparatus which carries out, by a reciprocating movement of a single hydraulic cylinder, the grasping and releasing of the tool, the changing of the attitude of the tool and the insertion of the tool into and the removal of the tool from the tool magazine, and a practical embodiment of the invention will be described hereinafter.

Figure 1:
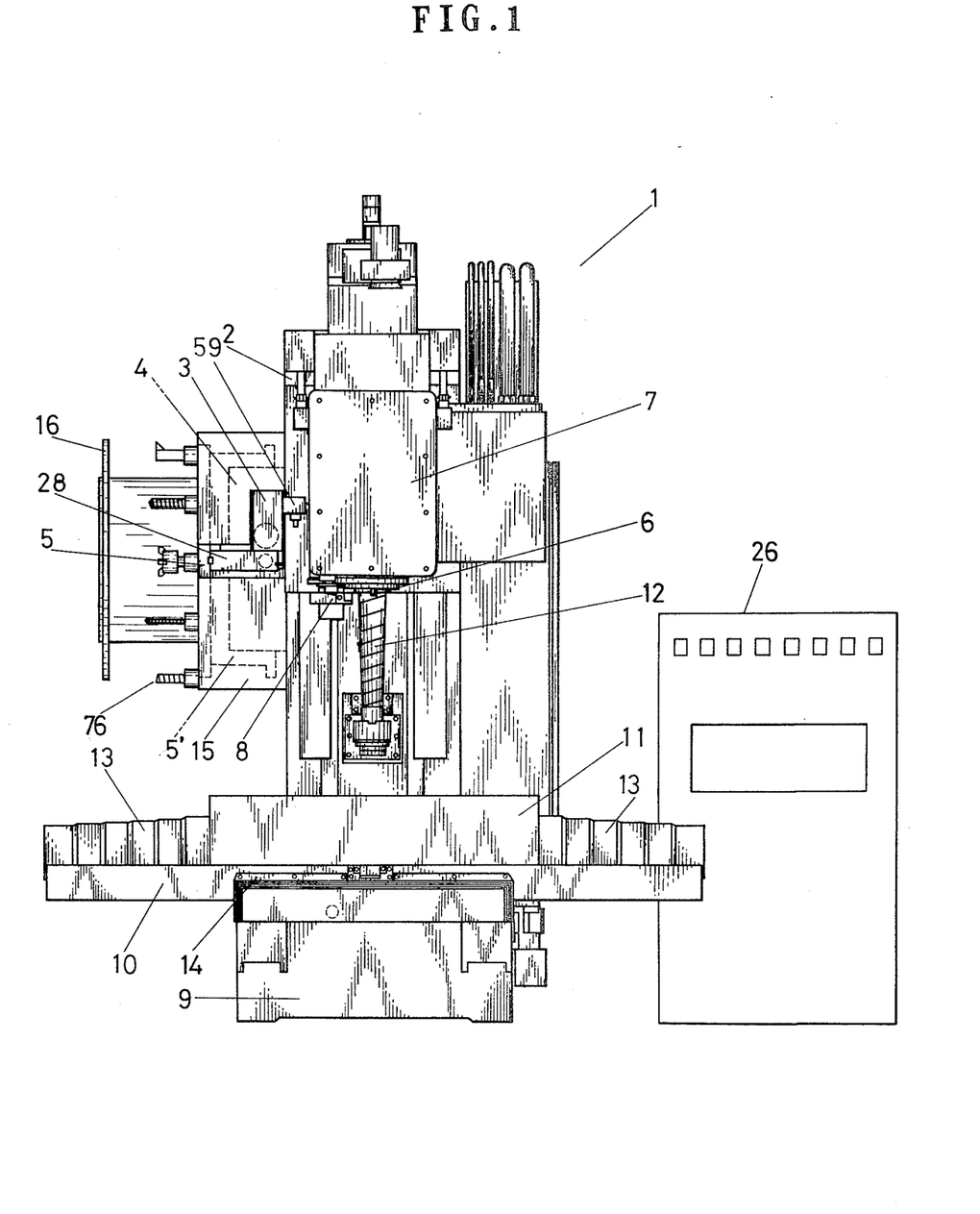
FIG. 1 is a front view of the principal part of the machine tool according to the present invention.
Figure 2:
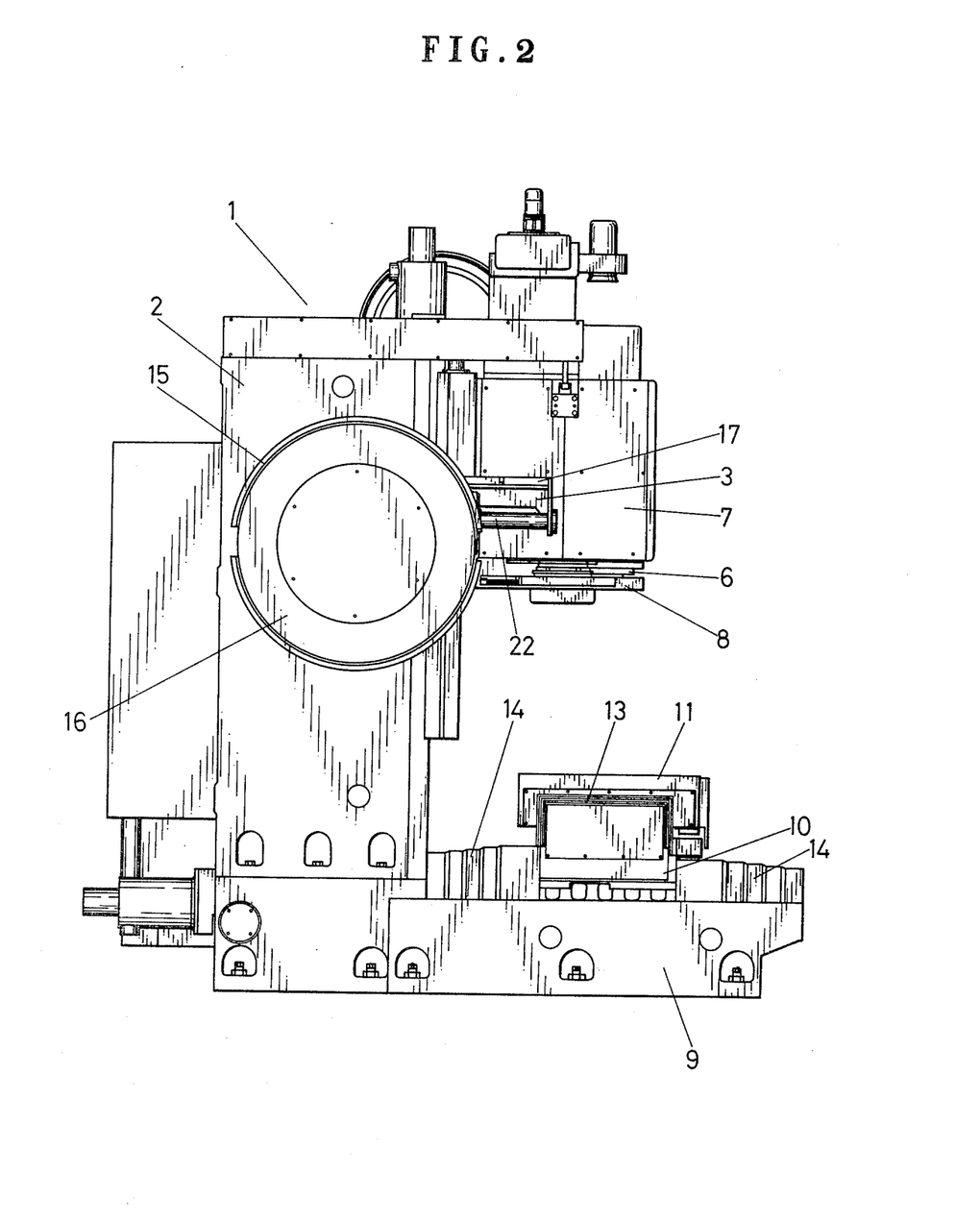
FIG. 2 is a side view thereof.

In FIGS. 1 and 2, a tool shifter 3, which is described more fully hereinafter, is disposed on the side of a column 2 of a machine tool 1, and, through an index mechanism 5', a tool magazine 5 is rotatably attached to a magazine base 4 which engages with the tool shifter 3. In the tool magazine 5 a number of tools 76 inserted into a tool shank 29 are kept freely receivable and releasable. A main shaft 6 is vertically disposed in the interior of a main shaft head 7 which is movable freely up and down the column 2, and at the bottom of the foregoing main shaft head 7 there is provided a conventional automatic tool exchange arm 8. The said arm 8 moves freely up and down and also is horizontally rotatable and it grasps the tool shank 29 held by the tool shifter 3 to attach the said shank to the main shaft 6. Further, it removes a used tool from the main shaft 6 together with the tool shank 29 so that the tool shifter 3 grasps the used tool. Details of this operation are described hereinafter. In the drawing there are shown a conventional base 9, a saddle 10, a table 11, a Z-axis feed screw cover 12, an X-axis feed screw cover 13, Y-axis feed screw cover 14, a magazine base cover 15, a safety cover 16 and a conventional controlling device 26 for controlling the operation of the said machine tool 1.

Figure 3:
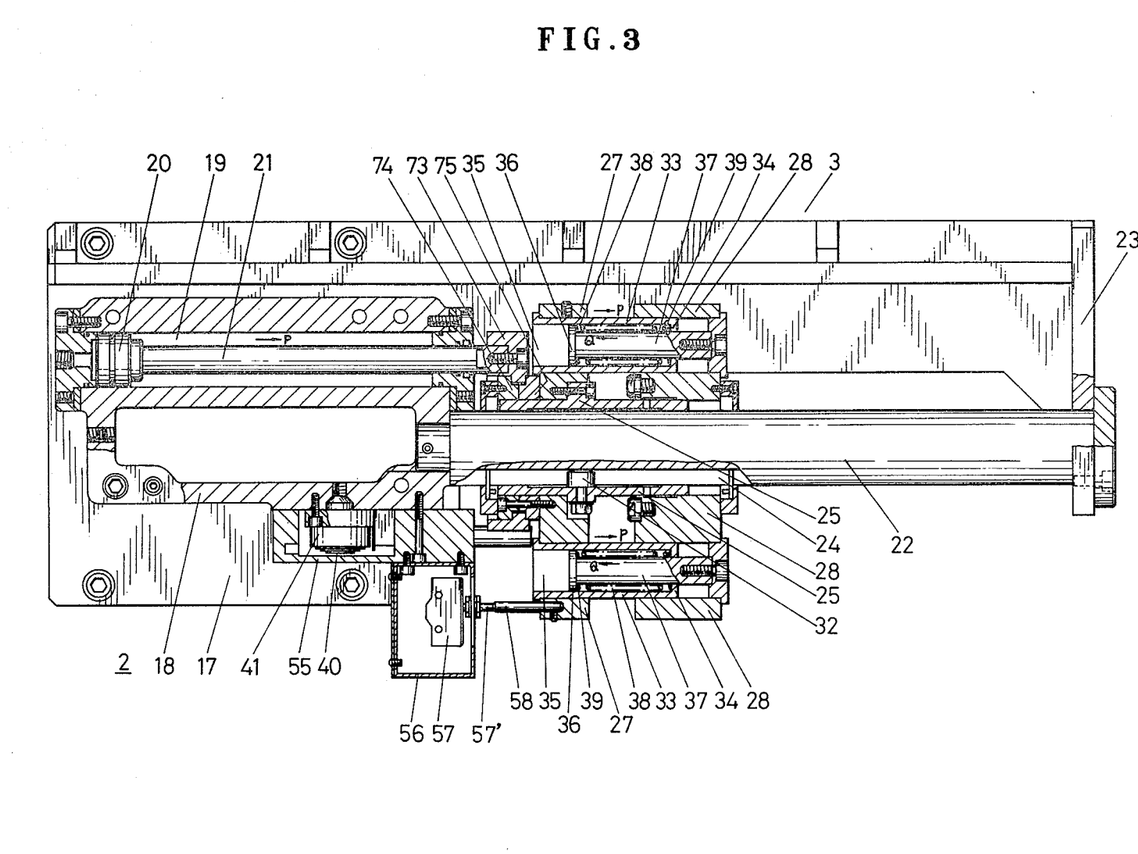
FIG. 3 is an enlarged side sectional view of the tool shifter thereof.
Figure 4:
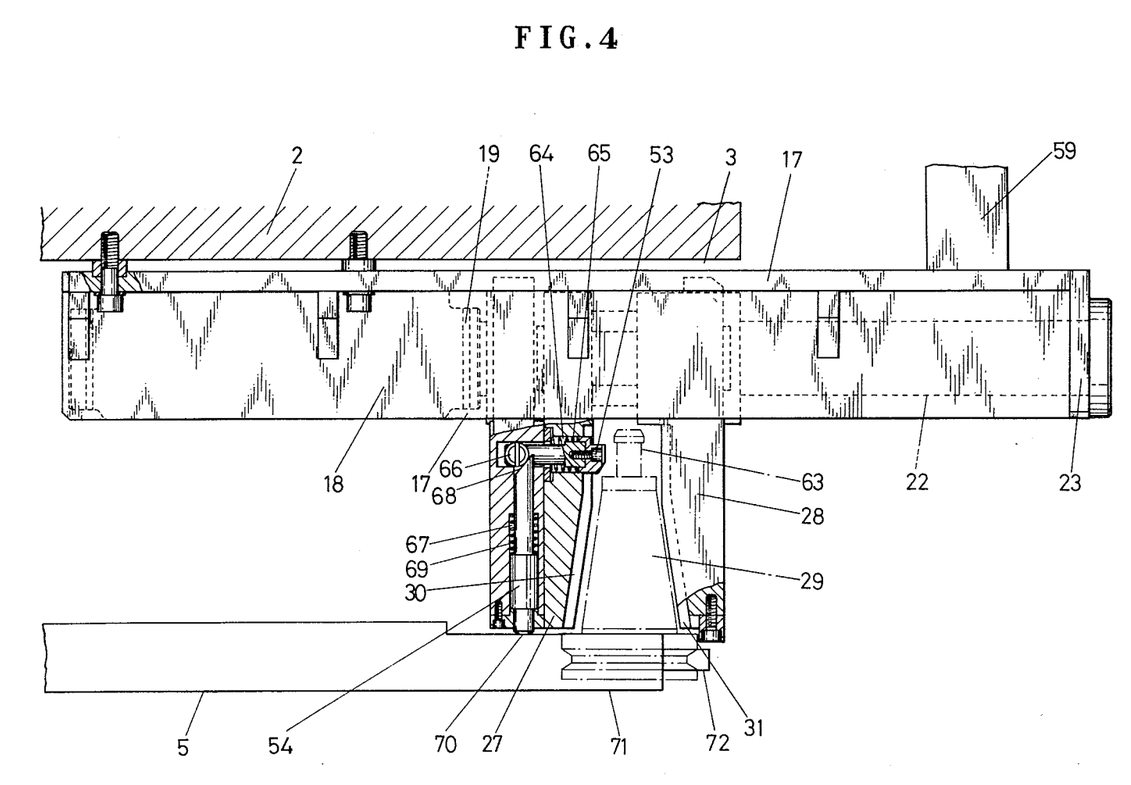
FIG. 4 is a top plan view of the tool shifter of FIG. 3.

In FIGS. 3 to 6 showing details of the tool shifter 3, a support frame 17 is mounted on the side of the column 2 and, on the foregoing support frame 17, there is provided a hydraulic cylinder 18, having a bore 19 into which a rod 21 with a piston 20 extends. The one end of a guide rod 22 which extends parallel to the hydraulic cylinder bore 19 is supported on the cylinder body 18 and the other end is supported by a support arm 23 mounted in the support frame 17. A spiral groove 24 is provided in the outside surface of the said guide rod 22, and a tool clamp 27 is attached to a sliding bushing 25 which is slidably mounted on the said guide rod 22. A tool clamp 28 is slidably mounted on the bushing 25 and the bushing 25 is connected to the outer end of the rod 21 in the hydraulic cylinder 19 through the parts 73, 74 and 75. In the opposed faces of the tool clamps 27 and 28 are recesses 30 and 31 which diverge, as shown in FIG. 4, to hold the tool shank 29 therebetween. A cam follower 32 which is rotatably mounted on the sliding bushing 25 freely rolls in the spiral groove 24. One end of each of a pair of cylinder 33 is attached to the top and bottom of the tool clamp 27 respectively, and the outer end of each cylinder (right end in FIG. 3), is closed by an end plate 34, and connecting rods 37, having enlarged ends 36 which slide within bores 35 in the cylinders 33, extend through the end plates 34 with the outer ends of the said connecting rods being connected to the top and bottom of the tool clamp 28. Clamp springs 39 are compressed resiliently in spaces 38 between the connecting rods 37 and the cylinders 33, and the cylinders 33 are always pushed in the direction of the arrow P and the connecting rods 37 in the direction of the arrow Q, so that the tool clamp 27 and the tool clamp 28 are resiliently moved in the closing direction toward each other.

Figure 5:
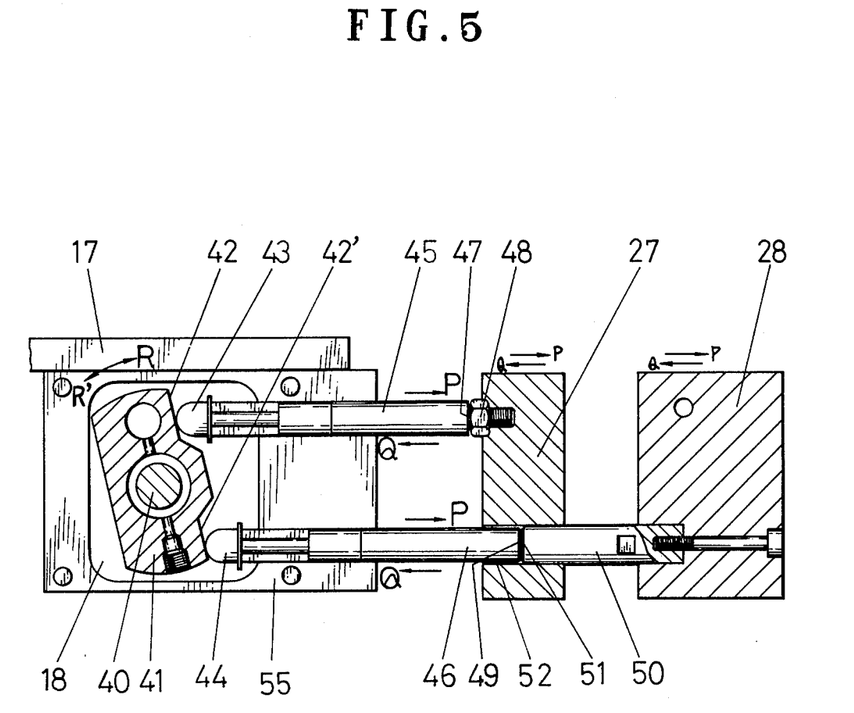
FIG. 5 is a partially sectional bottom plan view for a push rod part for the tool shifter of FIG. 3.

In FIGS. 3 and 5, push rods 45 and 46 are horizontally slidable in a cover 55 mounted on the under surface of the cylinder body 18 and in a direction parallel to the direction of sliding of the tool clamps 27 and 28 and rounded ends 43 respectively engage side faces 42 and 42' of a lever 41 attached to a rotatable horizontal shaft 40 which is mounted on the under surface of the cylinder body 18. An outer end 47 of the push rod 45 is threaded into an adjusting bolt 48 which is rotatably mounted on the tool clamp 28. The outer end of the push rod 46 slides within a guide hole 52 which is provided in the tool clamp 27, and an outer end 49 of the push rod 46 engages one end 51 of a rod 50 which projects from the tool clamp 28.

When the rod 21 of the hydraulic cylinder 19 is, as shown in FIG. 3, withdrawn to the farthest position, the tool shank 29 kept in the tool magazine 5 comes out and enters the space between the clamps 27 and 28, the said space being maintained constant.

In FIG. 4, an insert hole 64 is provided at the base of the tool clamp 27, extending laterally from the recess 30 and, in order to lock the tool shank 29 held by the tool clamps 27 and 28 to prevent it from coming-out, a lock pin 53 is slidably positioned therein and urged outwardly by a compressed spring 65. At the end of the lock pin 53 there is mounted a roller 66. Within a bore 67 extending from the front end face of the clamp 27 and which is transverse to an intersects the insert hole 64 is a compressed spring 69 urging unlocking pin 54 provided with an oblique end 68 at one end thereof into engagement with the roller 66. A rounded end 70 of the said unlocking pin 54 protrudes slightly from the tool clamp 27.

Figure 6:
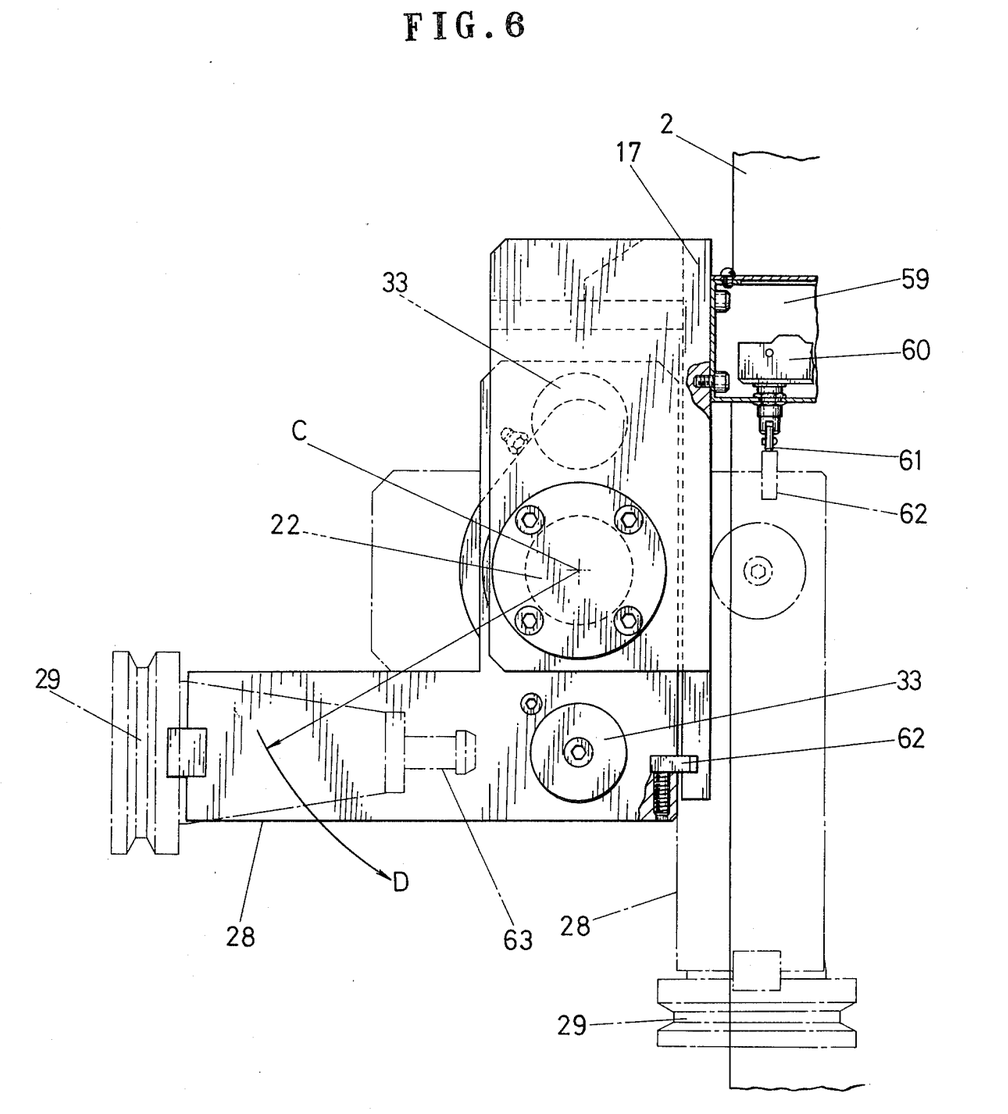
FIG. 6 is an end view of a tool clamp part thereof.

Reverting to FIG. 3, on the under surface of the cylinder body 18, is a bracket 56 on which is a rear-end limit switch 57 having a sensor 57' touched by a sensor rod 58 at the bottom of the tool clamp 27 when the piston 20 of the hydraulic cylinder 19 is withdrawn to the innermost position to actuate the rear-end limit switch 57. The bracket 56 is attached to the cover 55 for the lever 41. As shown in FIGS. 4 and 6, a dog 62 attached to the tool clamp 28 touches a sensor 61 of a front-end limit switch 60 when the tool clamp 28 advances to a front end position. The sensor 61 is mounted on a bracket 59 which is attached to the apparatus at the back in the neighborhood of the front end of the support frame 17. This sensor 61 touches the dog 62 provided at the tool clamp 28 when the said tool clamp 28 advances and reaches the front end while revolving in the direction of the arrow D (shown by chain lines in FIG. 6) so that the front-end limit switch 60 is actuated.

Figure 7:
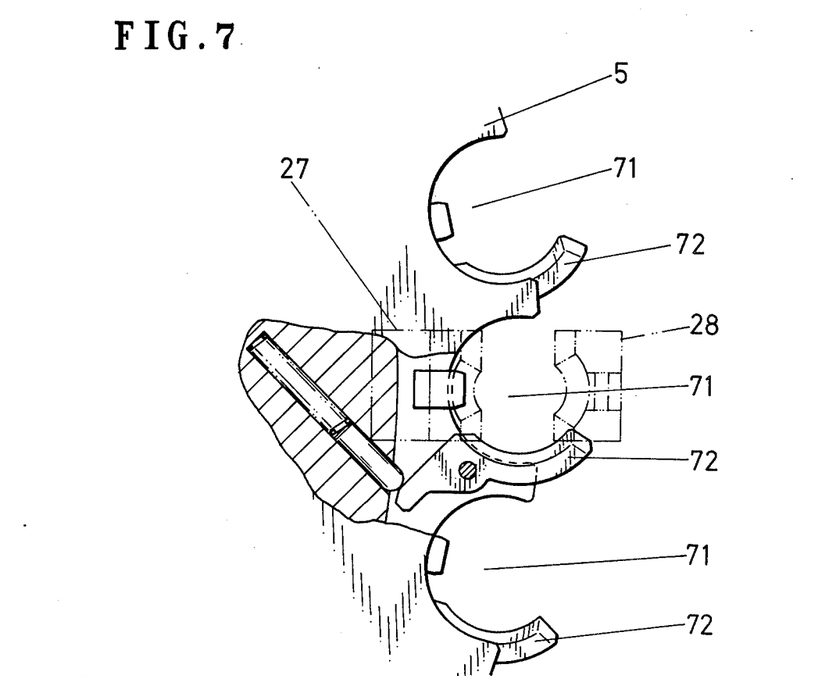
FIG. 7 is a partially enlarged front view of a pocket of the tool magazine.
Figure 8:
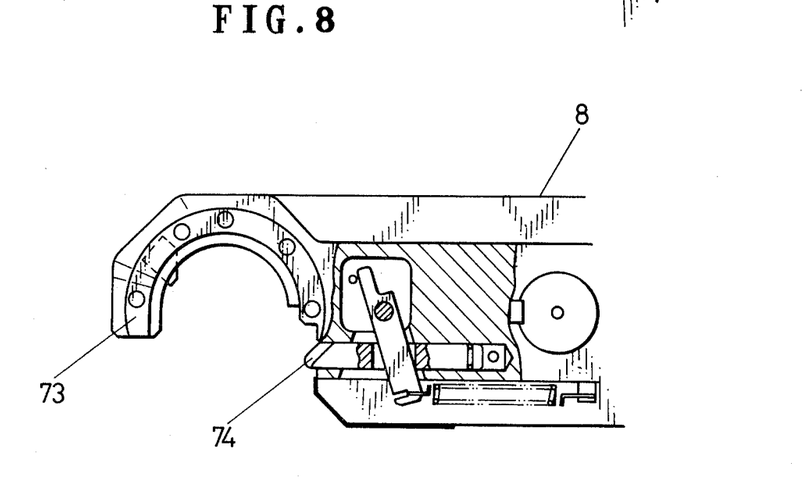
FIG. 8 is an enlarged plan view of a grasping claw for an automatic tool exchange arm.

In the foregoing tool magazine 5 a magazine pocket 71 is, as shown in FIG. 7, formed by cutting a semicircular recess in a portion of the outside circumference thereof and an engaging claw 72 having an arc shape is resiliently rotatably held in the said magazine pocket 71 in order to prevent the tool shank 29 from coming out the pocket. At both ends of the automatic tool exchange arm 8, is a grasping claw 73 having a semi-arcuate shape, as shown in FIG. 8, for grasping the tool shank 29 and the tool shank 29 is prevented from being removed from the claw by an engaging pin 74 which is freely reciprocally movable. The tool magazine 5 and automatic tool exchange arm 8 are wellknown elements. In the drawing the reference number 63 designates a lock groove in the tool shank 29.

In describing the operation of the present invention with reference to the drawings, when the piston 20 of the hydraulic cylinder 19 of the tool shifter 3 withdraws, as shown in FIGS. 3 and 4, to the farthest point of the upper left side in the drawing and the tool clamps 27 and 28 are opened, the tool shank 29 is not held therein and the sensor rod touches the sensor 57' of the rear-end limit switch 57 to actuate the said rear-end limit switch 57 so that the tool clamps 27 and 28 open and to inform to the controlling device 26 that the tool magazine 5 is rotatable. In this condition, as shown in FIG. 5, the tip end of the adjusting bolt 48 threaded into the tool clamp 27 has pushed the push rod 45 in the direction of the arrow Q to make the rounded end 43 engage the side face 42 of the lever 41 is so that the said lever 41 inclined in the direction of the arrow R'. The rounded end 44 of the push rod 46 is engaged by the end face 42' at the lower side of the lever 41 and, further, the said push rod 46 and the rod 50 fixed in the tool clamp 28 engage each other so unless the tool clamp 27 moves in the direction of the arrow P, the tool clamp 28 can not move toward the tool clamp 27 in the direction of the arrow Q. Therefore, the specified distance is maintained. The tool shank 29 in the tool magazine 5 can pass up and down between the tool clamps 27 and 28 when the tool magazine 5 is rotated.

In FIGS. 1 and 2, the tool magazine 5 is provided with the built-in index mechanism 5' on the magazine base 4 on the side of the column 2 of the machine tool 1 and is mounted at a position where a desired cutting tool can be taken out of the magazine by rotating the magazine under the direction of the conventional controlling device 26 for the machine tool 1. The tool shifter 3 which is mounted on the side of the column 2 starts to operate and under the control of the conventional controlling device the hydraulic cylinder 19 attached to the support frame 17, as shown in FIGS. 3 and 4, is actuated under the direction of the controlling device to cause the piston 20 attached to the inner end of the rod 21 (upper left end in the drawing) to advance in the direction of the arrow P. The tool clamp 27 which is connected to the outer end of the rod 21 (upper right end in the drawing) and which is slidable on the guide rod 22 on the slidable bushing 25 on the guide rod 22 starts to advance together with the slidable bushing 25 in the direction of the arrow P. When the tool clamp 27 advances, the push rod 45 attached to the adjusting bolt 48 on said tool clamp 27 is moved, as shown in FIG. 5, in the direction of the arrow P and, simultaneously with this, the lever 41 rotates and the push rod 46 slides in the directions of the arrow R and in the direction of the arrow Q respectively. When the tool clamp 27 advances the cylinders 33 attached to the tool clamp 27 are pushed in the direction of the arrow P and the clamp springs 39 in the gaps 38 between the cylinders 33 and the connecting rods 37 and between the ends 36 and plates 34 urge the connecting rods 37 backwards in the direction of the arrow Q within the cylinders 33 and the tool clamp 28 attached to the connecting rods 37 also advances in the direction of the arrow Q, as described below, so that the tool clamp 27 and the tool clamp 28 close resiliently. The recesses 30 and 31 surround the tool shank 29 of the cutting tool in the magazine pocket 71 of the tool magazine 5 and the tool clamps 27 and 28 grasp the tool shank from the opposite sides due to the resilient force of the clamp springs 39.

As the piston 20 starts to advance within the hydraulic cylinder 19, as shown in FIGS. 3 and 5, the tool clamp 28 moves backwards in the direction of the arrow Q in relation to the tool clamp 27 due to the force of the spring 39 and the tip end 51 of the rod 50 protruding from the tool clamp 28 pushes the end 49 of the slidable push rod 46 in the direction of the arrow Q within the guide bore 52 in the tool clamp 27 so that the push rod 44 thereof pushes the side face 42' of the lever 41 whereby the lever 41 rotates in the direction of the arrow R around the shaft as the center. The side face 42 pushes the rounded end 43 of the push rod 45 in the direction of the arrow P, the push rod 45 slides in the direction of the arrow P and the end 47 thereof pushes against the adjusting bolt 48 in the tool clamp 27 so that the tool clamps 27 and 28 grasp the tool shank 29 at the same time. By adjusting the adjusting bolt 48 the grasping of the tool shank 29 is, as shown in FIG. 7, completed at the center position of the pocket 71 of the tool magazine 5. At the position where the tool clamps 27 and 28 hold the tool shank, the rounded end 70 of the unlocking pin 54 touches the end face of the tool magazine 5 and is urged inwardly of the bore 67 so that the roller 66 is pushed to the left by the oblique end 68 of the unlocking pin 54; consequently, the lock pin 53 to which the roller 66 is attached is also pushed to the left and the lock pin 53 is withdrawn from the lock groove 63 of the tool shank 29 so that it does not prevent the movement of the tool shank 29 in or out of the magazine.

Figure 9:
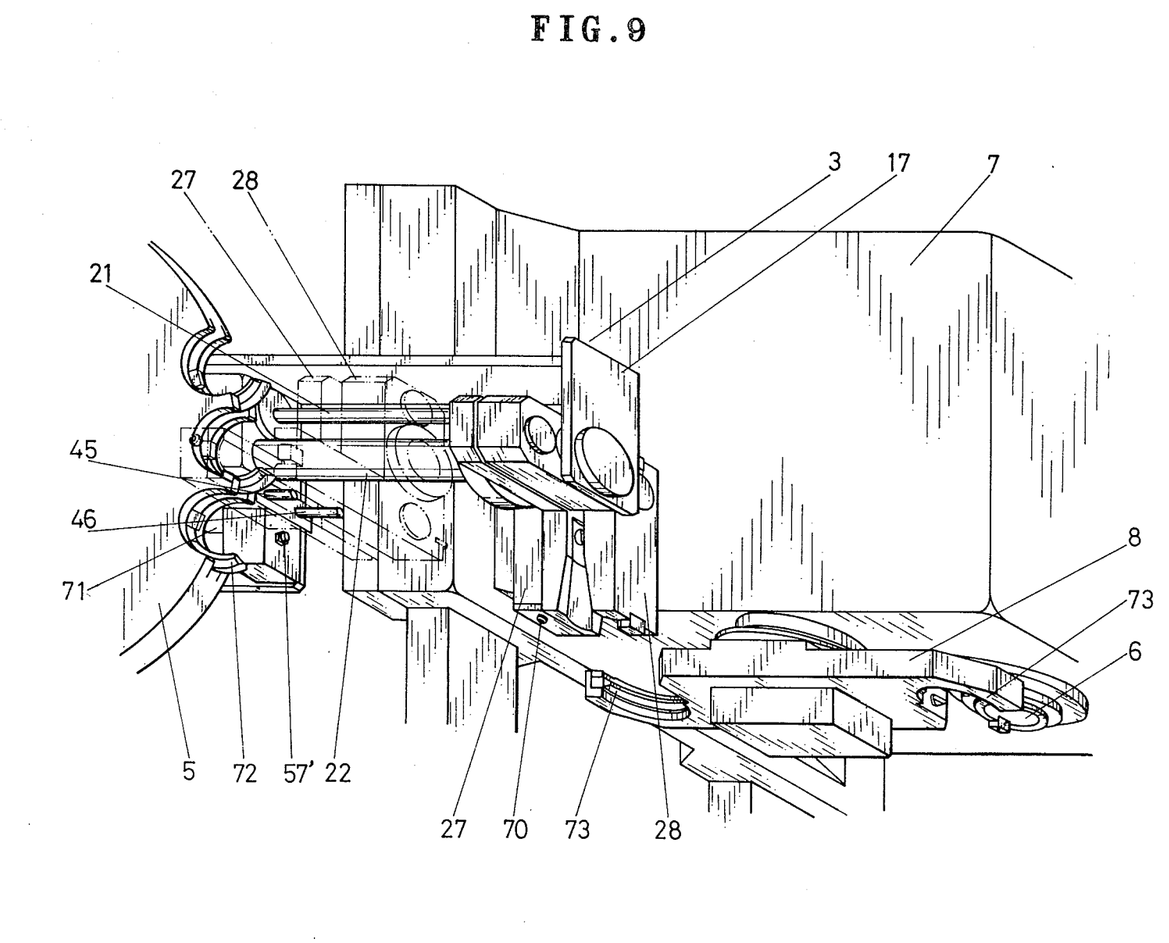
FIG. 9 is a perspective view for showing a method of operation.

In FIG. 4, after the tool clamps 27 and 28 grasp the tool shank 29, the tool clamps 27 and 28 advance due to the actuation of the hydraulic cylinder 19, and the tool shank 29 is removed from the pocket 71 of the tool magazine 5 and, concurrently, the rounded end 70 of the unlocking pin 54 moves away from the tool magazine 5 and the said unlocking pin 54 slides out of bore 67 due to the resilient force of the compressed spring 60 so that the oblique end 68 does not move the roller 66 to the left, whereby the lock pin 53 slides resiliently towards the right into the groove 65 of the tool shank 29 for preventing the tool shank 29 from coming out of the clamps 27 and 28. Simultaneously with the advancement of the tool clamps 27 and 28 on the guide rod 22 on the slidable bushing 25, as shown in FIG. 3, the cam follower 32 rolls along the spiral groove 24 in the guide rod 22 so that, as shown in FIG. 6, the tool clamps 27 and 28 rotate only 90° in the direction of the arrow D around the axis C of the guide rod 22 while carrying the tool shank 29 so as to turn the axis of the tool shank 29, as shown in FIG. 6, so that it is oriented in the vertical direction. When the piston 20 of the hydraulic cylinder 19 reaches the front end (tool exchange position) of the hydraulic cylinder 19, the dog 62 attached to the tool clamp 28 touches the sensor 61 of the front-end limit switch 60 attached to the bracket 59 to actuate the front-end limit switch 60 and a signal actuated by the limit switch 60 is transferred to the controlling device 26 to inform that the tool clamps 27 and 28 are at the position for exchanging a tool and it stops the working of the hydraulic cylinder 19 and, at the same time, it actuates the automatic tool exchange arm 8. After rotating from a standby position without any hindrance to a cutting operation as shown in FIG. 9, the grasping claw 73 attached to the tip end of the automatic tool exchange arm 8 grasps the tool shank 29 of the tool shifter 3 and, simultaneously with this, another grasping claw 73 provided at the other end of the automatic exchange arm 8 grasps the tool shank 29 of the tool inserted into the main shaft 6. When the grasping claw 73 grasps the tool shank 29, the rounded end 70 of the unlocking pin 54 of the tool clamp 27 hits against the top face of the automatic tool exchange arm 8 and is moved into the tool clamp 27 and as the oblique end 68 moves the roller 66 to the left, the lock pin 53 also moves to the left to move it out of the lock groove 63 of the tool shank 29. Therefore, the tool shank 29 can be pulled out of the clamp in the axial direction. After the tool shank 29 is grasped by the respective grasping claws 73 attached to both ends of the automatic tool exchange arm 8, the automatic tool exchange arm 8 is moved straight downwardly at the direction of the controlling device 26 in order to withdraw the tool shank 29 for the next tool to be used from the tool clamps 27 and 28 and also to withdraw the tool shank 29 for the just used tool from the main shaft 6. Then the arm is rotated until the axial center of the tool shank 29 for the just used tool comes into alignment with the tool clamps 27 and 28 and the axial center of the tool shank 29 for the next tool to be used comes into alignment with the axial center of the main shaft 6 and then it rises to insert the tool shank 29 for the next tool to be used into the main shaft 6 and the tool shank 29 for the just used tool into the tool clamps 27 and 28. When the automatic tool exchange arm 8 rises and the tool shank 29 for the used tool is inserted into the tool clamps 27 and 28, the tip of the tool shank 29 engages the lock pin 53 forcing it to withdraw so that the tool shank can be inserted and fitted between the tool clamps 27 and 28.

Next, the automatic tool exchange arm 8 rotates in the reverse direction until it comes to the standby position under the direction of the controlling device 26. Then, it stops and is ready for the next tool exchange operation. When the grasping claw 73 does not grasp the tool shank 29 held by the tool clamps 27 and 28 any more, the lock pin 53 resiliently protrudes and the tip end thereof fits into the lock groove 63 of the tool shank 29 to prevent the tool shank 29 from coming out.

On the other hand, the hydraulic cylinder 19 is actuated again in the reverse direction to the previous direction and the tool clamps 27 and 28 move in the opposite direction and approach the rear end of the guide rod 22 rotating in the opposite direction to the arrow D as the cam follower 32 is guided in the spiral groove 24 while moving in the direction of the arrow Q along the guide rod 22. When the center of the space between the tool clamps 27 and 28 reaches a position corresponding to the center of the pocket 71 of the tool magazine 5, the bolt 48 on the tool clamp 27 pushes the push rod 45 in the direction of the arrow Q and the rounded end 43 pushes the side face 42 of the lever 41 and the lever 41 rotates in the reverse direction to the arrow R, the side face 42' engages the rounded end 44 of the push rod 46 to push the rod in the direction of the arrow P, the rod 46 pushing the rod 50 protruding from the tool clamp 28 to move the tool clamp 28 away from the clamp 27 against the resiliency of the clamp springs 39. When the piston 20 reaches the rear-end of the hydraulic cylinder 19, the sensor rod 58 protruding from the tool clamp 28 engages the sensor 57' of the rear-end limit switch 57 on the bracket 56 attached to the cover 55 to actuate the rear-end limit switch 57 and the signal thereof stops the operation of the tool shifter 3 and informs the controlling device 26 that the tool magazine 5 is at the rotatable position.

In the tool shifter of the present invention, the reciprocating movement of only one hydraulic cylinder can perform three kinds of operations, that is, the grasping and releasing of the tool shank having the desired cutting tool attached thereto, the changing of the attitude of the tool and the moving of the tool into and out of the tool magazine. Moreover, the tool exchanging structure of the machine tool of the tool exchange is greatly simplified because the tool magazine can be mounted thereon with the axes of the tool holders therein at an angle to the main shaft of the machine tool. Therefore, the production cost for such a machine tool can be substantially reduced.

Furthermore, not only can the operation be done safely due to the fully automatic structure, but also increased efficiency can be achieved by greatly shortening the time required for exchanging a tool so that the loss due to the stopping of the cutting operation by the machine tool is minimized.

What is claimed is:

1. A tool shifter for a machine tool having a magazine for holding tools with their axes at an angle to the main shaft of the machine tool and having a tool exchange means for exchanging tools on said main shaft, said tool shifter comprising guide means for extending along an axis between the magazine and the tool exchange means, clamp means for engaging the shank of an exchangeable tool and movable along said guide means between a first position adjacent the magazine at which said clamp means is in position to grasp a tool shank of a tool in the magazine and a second position adjacent the tool exchange means at which said clamp means is in a position to deliver a tool to the tool exchange means, means on said guide means for turning said clamp means around the axis of the guide means as said clamp means moves along said guide means, clamp opening means adjacent said one position engageable by said clamp means for opening said clamp means when said clamp means engages said clamp opening means, and a single hydraulic cylinder connected to said clamp means for moving said clamp means back and forth along said guide means between said first and second positions.

2. A tool shifter as claimed in claim 1 in which said clamp means comprises a pair of spaced opposed clamp members movable toward and away from each other in a direction parallel to the axis of said guide means, rod and sleeve means connected between said clamp members, and spring means engaged with said rod and sleeve normally urging said clamp members toward each other.

3. A tool shifter as claimed in claim 1 in which said clamp means comprises a pair of spaced opposed clamp members movable toward and away from each other in a direction parallel to the axis of said guide means, and resilient means connected between said clamp members normally urging said clamp members toward each other, and said clamp opening means comprises a pair of slidable rod means slidably mounted in said shifter with one end of each rod means engaged with a respective one of said clamp members, and a lever pivotably mounted on said shifter having the other ends of said rod means respectively engaged with the lever on opposite sides of said pivotable mounting thereof, said lever, when said clamp means is in said one position, being engaged by the rod means of one of said clamp member for pivoting said lever to a position in which the rod means for said other clamp member urges said other clamp member away from said one clamp member against the action of said resilient means.

4. A tool shifter as claimed in claim 1 in which said guide means comprises a guide rod having a cam means extending spirally along said guide rod, and said clamp means comprises a bushing and a pair of clamp members slidable on said bushing toward and away from each other, said bushing having cam follower means engaged with said cam means.

* * * * *